Feb. 5, 1929.

P. L. GRAHAM 1,701,461

SEPARABLE FASTENER

Filed Nov. 26, 1927

INVENTOR
PALMER L. GRAHAM
BY
ATTORNEY

Patented Feb. 5, 1929.

1,701,461

UNITED STATES PATENT OFFICE.

PALMER L. GRAHAM, OF TERRE HAUTE, INDIANA.

SEPARABLE FASTENER.

Application filed November 26, 1927. Serial No. 235,884.

This invention relates to separable fasteners of the type used to connect together adjacent apparel portions as exemplified by adjacent edges of the cuffs of shirts, and has for its object the provision of a separable fastener permitting either normal or close fastening of the cuff parts together, or a loose spaced fastening such as is desirable for warm weather comfort and which permits the sleeve to be drawn up without unfastening the cuff.

A feature of the invention consists in a separable fastener of the type described having the outer parts, or those which remain at the outer sides of the cuffs, permanently connected by flexible linking means of sufficient length to span the cuff in either the normally closed or loosely fastened positions above described. This flexible linking means may consist of a linked chain of the same material as the separable fasteners which will ensure the permanent association of the two cooperating parts of the fastener and prevent the loss of one, and which will not detract from, but on the other hand, will improve the appearance of the separable fastener.

The invention is more fully described in the following specification and is illustrated in the accompanying drawings forming part thereof and in which:—

Figure 1:
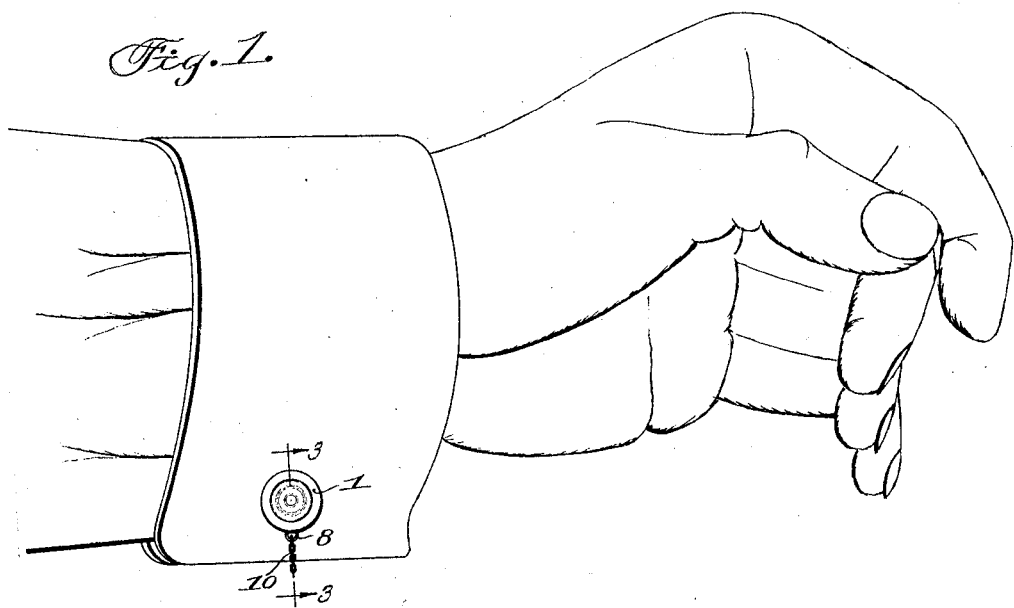
Figure 1 is a perspective view of a cuff forming part of a shirt or waist and closed by a separable fastener constructed in accordance with the present invention.
Figure 2:
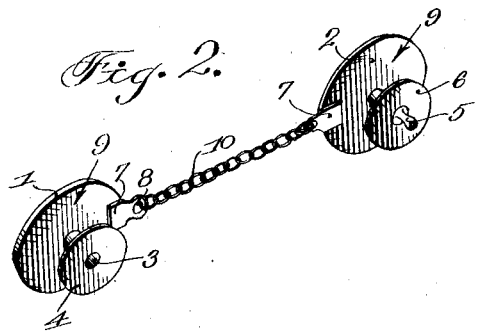
Figure 2 is a perspective detail of the fastener, separated.

Referring to the drawings by numerals, 1 and 2 designate the cooperating parts or halves of a separable fastener of the well known "snap fastening" type, one half of the fastener having a socket 3 formed in the face of its inner plate or head 4, and the other half of the fastener having a compressible hollow stud 5 projecting from the inner face of its inner plate or head 6 which snaps into the socket 3 and detachably or separably unites the halves of the fastener.

These fasteners are used largely with sleeve attached shirt cuffs of the single and double fold types which are practically in universal use today, and comprise cooperating halves each having outer and inner heads or plates spaced by a shank, the inner heads being inserted through the button holes of the cuff. They have the disadvantage of permitting the cuff to be fastened in only one and the fully closed position. They are separate and the loss of one means the loss of use of both, and of the full set so far as matched fasteners are concerned.

To provide permanent association of the two halves of the fastener and to permit of closed and loose connection of the edges of the cuff, as may be desired, the halves or cooperating parts 1 and 2 of the separable fastener are permanently connected by a flexible linkage. Small metal tabs 7 having eyes 8 in their ends may be suitably and permanently fixed to the under face or inner faces 9 of the outer heads or plates of the fastener halves with their eye ends projecting beyond the edge of the fastener plate. The opposite ends of a flexible connector, such as the linked chain 10 of a length suitable for the purposes described, are inserted through the eyes 8 and closed to provide a permanently attached flexible connection. The tabs 7, when the fasteners are in use, are concealed from view and the link chain which is visible, adds to, rather than detracts from the appearance of the fastened cuff.

Figure 3:
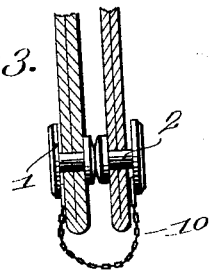
Figure 3 is a fragmentary vertical section on the line 3—3 of Figure 1.
Figure 4:
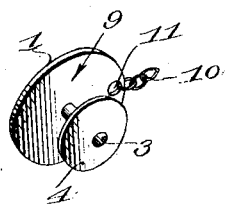
Figure 4 is a detail showing a different manner of connecting the ends of the linking chain to the fastener.

The material of the flexible connection and its nature may be varied within reasonably wide limits. And as shown in Figure 4, the tabs 7 may be dispensed with and the fastener linking chain or other connector may be directly connected to the outer face plate or head 9 of the fastener halves as by insertion through a small hole 11 (Fig. 4) drilled in the plates 9 near their outer edges. As will be seen from an inspection of Figure 3, when the fasteners 1 and 2 are snapped together to interlock with the cuff fully closed, the linked chain 10 loosely loops around and over the adjoining closed edges of the cuff. And, obviously, the fasteners may be separated or "unsnapped" and the cuff be loosely held by the fasteners through their connecting flexible chain 10, leaving the wrist free and untrammeled by closely fitting cuff. In this position of the fasteners, the cuffs may be drawn up on the forearms without detaching the fasteners, an obvious convenience in working or in the lavatory.

What I claim, therefore, and desire to secure by Letters Patent is:

1. A pair of complemental separable button-type fasteners detachably interlocking for close garment closure and having a loose flexible chain connection permitting loose garment closure with said complemental fasteners disconnected from each other and inserted in the opposite sides of the garment to be loosely closed by the interconnecting chain.

2. A pair of complemental separable button-type fasteners arranged for detachable interlocking engagement for close garment closure and having a loose flexible chain connecting the outer sides thereof and permitting loose garment closure with the said fasteners attached to opposite sides of the garment to be loosely closed and disconnected from each other.

3. A separable fastener for cuff links comprising a pair of cooperating button type sections each having spaced outer and inner heads to embrace a fold of fabric therebetween with an intermediate shank to extend through a button hole in said fabric fold, the inner heads of the pair extending through the button holes of the cuff and having means to detachably interlock and provide a close garment-closure, and a flexible connector loosely and permanently joining the outer heads of the sections and permitting loose garment closure with the inner heads of the pair disconnected from each other and inserted in the opposite folds of the garment portion to be so connected.

Signed at Terre Haute in the county of Vigo and State of Indiana this 22d day of November, A. D. 1927.

PALMER L. GRAHAM.